United States Patent [19]

Blossom et al.

[11] Patent Number: 5,546,518
[45] Date of Patent: Aug. 13, 1996

[54] SYSTEM AND METHOD FOR COMPOSING A DISPLAY FRAME OF MULTIPLE LAYERED GRAPHIC SPRITES

[75] Inventors: Jon Blossom, Oakland, Calif.; Michael Edwards, Woodinville, Wash.

[73] Assignee: Microsoft Corporation, Redmond, Wash.

[21] Appl. No.: 369,649

[22] Filed: Jan. 6, 1995

[51] Int. Cl.$^6$ .................................... G11B 27/02
[52] U.S. Cl. ............................ 395/152; 395/135
[58] Field of Search ................... 395/121, 157–158, 395/152, 135

[56] References Cited

U.S. PATENT DOCUMENTS

| | | | |
|---|---|---|---|
| 5,101,365 | 3/1992 | Westberg et al. | 395/158 |
| 5,103,499 | 4/1992 | Miner et al. | 395/162 |
| 5,235,677 | 8/1993 | Needle et al. | 395/131 |
| 5,241,656 | 8/1993 | Loucks et al. | 395/158 |
| 5,249,264 | 9/1993 | Matsumoto | 395/134 |
| 5,339,386 | 8/1994 | Sodenberg et al. | 395/122 |
| 5,356,156 | 10/1994 | Suzuki et al. | 273/437 |

OTHER PUBLICATIONS

James, Rahner, "Real–time animation: Presenting a Sprite Driver for EGA", Dr. Dobb's Journal, vol. 15, No. 1, p. 16(13)., Jan. 1990.

Heck, Mike, "Director 4.0 for Windows: (Macromedia Inc) (one of three presentation authoring package evaluations in All the Screen's a Stage)", Journal: InfoWorld Oct. 31, 1994 v16 n44 p. 104(7).

Eddon, Guy R., "Fundamental techniques for sprite animation in Windows–based applications. (Microsoft Corp.'s Microsoft Windows graphical user interface)", Journal: Microsoft Systems Journal Dec. 1993 v8 n12 p. 81(7) COPYRIGHT M&T Publishing Inc. 1993.

Stafford, David, "Create your own animation engine: What's the Code?)", Journal: Computer Shopper Aug. 1994 v14 n8 p. 600(2), COPYRIGHT Ziff Davis Publishing 1994.

Primary Examiner—Heather R. Herndon
Assistant Examiner—Rudolph J. Buchel
Attorney, Agent, or Firm—Lee & Hayes, PLLC

[57] ABSTRACT

A data processing apparatus includes a graphics display device for displaying a display frame comprising a plurality of display frame pixels. A sprite management system composes the display frame from a plurality of graphic sprites. Each graphic sprite comprises a plurality of sprite pixels and corresponding sprite pixel values. Each sprite has a specified depth relative to the other sprites. One of the sprites is designated to be a video sprite. This sprite is loaded with a chroma-key value. The sprite management system includes a data processing device connected to access a display frame composition buffer. The data processing device is programmed to write pixel values of individual sprites to the display frame composition buffer. This writing begins with the pixel values of the sprite having the greatest depth and proceeds with the pixel values of the remaining sprites in order of decreasing sprite depth. The display frame data is then passed to a video overlay board which overlays a video image over those pixels containing the chroma-key value. The result is a display frame in which the plurality of graphic sprites, including the video sprite, appear layered with respect to each other in accordance with their respectively specified depths.

26 Claims, 8 Drawing Sheets

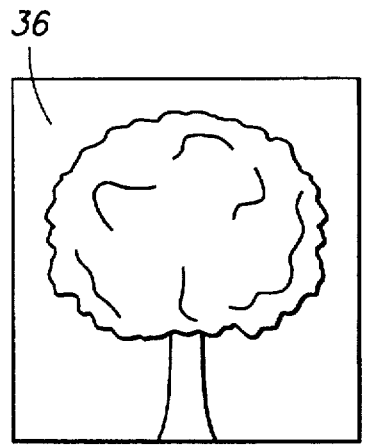
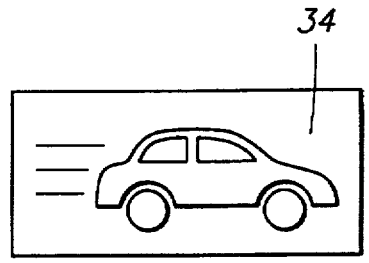
*Fig 2*
PRIOR ART
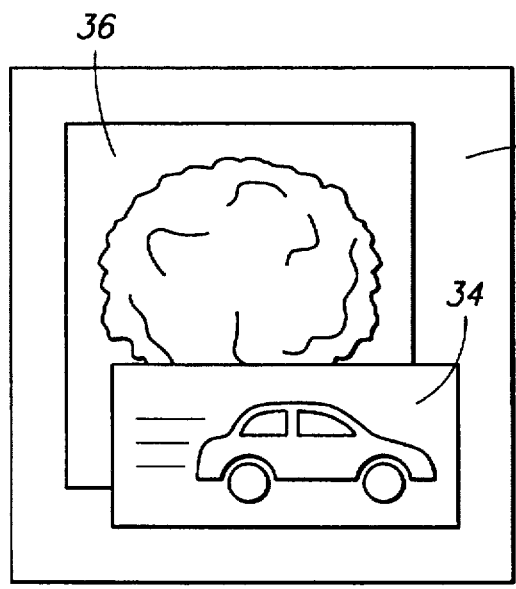
*Fig 3*
PRIOR ART
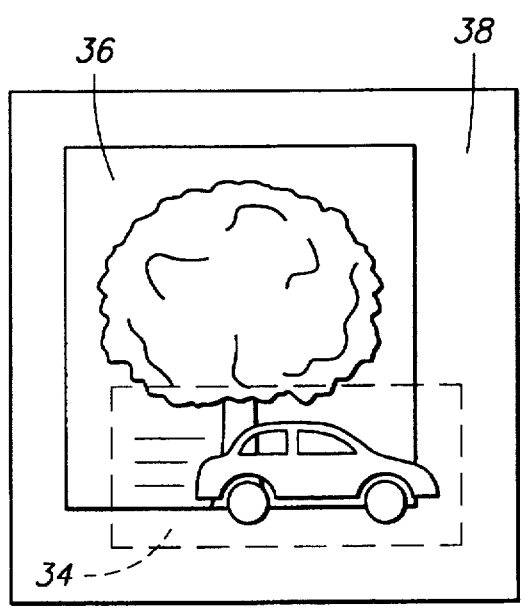
*Fig 4*
PRIOR ART 5,546,518

1

SYSTEM AND METHOD FOR COMPOSING A DISPLAY FRAME OF MULTIPLE LAYERED GRAPHIC SPRITES

TECHNICAL FIELD

This invention relates to sprite management systems and methods for displaying partially overlying or layered sprites in conjunction with bit-mapped graphics display systems.

BACKGROUND OF THE INVENTION

Computer and game systems often include display devices which are capable of displaying both alphanumeric data and graphic images. Such display devices typically comprise cathode ray tubes (CRT) or flat-panel displays. Display devices such as these utilize raster graphics, in which an image is specified in terms of an array of component points called pixels (short for "picture elements"). With raster graphics, an overall image or display frame is formed from a set of horizontal scan lines, each made up of individual pixels. The display frame or image is thus simply a matrix of pixels covering the entire screen area. In a CRT display, the entire surface or raster of the CRT tube is scanned sequentially, one line at a time, top to bottom, by varying only the intensity of the electron beam for each pixel on a line. Although flat-panel displays do not use a scanning electron beam, they operate in an analogous manner, including the display of multiple lines of individual pixels.

In popular personal computers, a display frame is specified by a matrix of pixel values having a one-to-one correspondence to the display frame pixel matrix. Each pixel value specifies the color or brightness which is to be displayed by a corresponding display frame pixel. The pixel value matrix is stored in a frame buffer. A frame buffer is simply a portion of computer memory having individual storage locations which are mapped to individual display frame pixels. A typical computer contains hardware to repetitively access the frame buffer and to update a display frame pixel matrix or raster based on the contents of the frame buffer. To compose a display frame, a computer program simply writes specific values to correct locations in the frame buffer, and the hardware automatically converts the values to corresponding colors or brightness levels on the display frame. An image composed in this manner is often referred to as a bit-mapped image.

FIG. 1 shows an example of this type of computer and display system, generally designated by the reference numeral 20. System 20 includes a desktop unit 22 and an external display device such as a CRT 24. CRT 24 includes a display frame 26 comprising a two-dimensional matrix or array of display frame pixels (not individually shown).

Desktop unit 22 includes a CPU or data processor 28, random access frame buffer memory 30, and a display processor 32. These elements communicate with each other through a control and communications bus 33. Both data processor 28 and display processor 32 have access to frame buffer memory 30. To compose an image or display frame, data processor 28 writes appropriate data to locations in frame buffer memory 30 which are mapped to individual display frame pixels. Display processor 32 reads this data and converts it to appropriate signals for driving CRT 24.

Other types of computer systems and devices, including many computer-controlled game devices, include graphic sprite management hardware, which operates somewhat differently than the bit-mapped system described above. A graphic "sprite" is a graphic image which forms a part or region, usually a rectangle, of an overall computer screen or display frame. The display frame is composed of one or more of such sprites. Each sprite has specified horizontal and vertical display frame coordinates relative to the display frame, as well as a specified depth coordinate or Z-level relative to other sprites. This allows the sprite management hardware to layer the various sprites on the display frame.

As an example, FIG. 2 shows two individual sprites, labelled 34 and 36. Sprite 36 is a tree which is to remain stationary in the display frame. Sprite 34 is a car which is to move across the display frame in front of the tree. To display these sprites using sprite management hardware, sprite 34 is given a Z-level of 1 and sprite 36 is given a Z-level of 2. The sprites are also given appropriate horizontal and vertical display frame coordinates. All horizontal and vertical coordinates remain constant except for the horizontal coordinate of car sprite 34, which increases to move the car across the display frame.

FIG. 3 shows a display frame 38 showing both sprites. Car sprite 34 lies in a layer or plane above that of sprite 36. In the portions of display frame 38 where the sprites overlap, the uppermost sprite, car sprite 34, hides the lowermost sprite, tree sprite 36. To make the car appear to pass behind the tree, it would only be necessary to give the car sprite a greater depth coordinate than the tree sprite.

To improve images such as that shown by FIG. 3, sprite management hardware typically allows a sprite to contain "transparent" pixels—pixels which are not meant to obscure underlying sprites. Transparent pixels greatly simplify animation sequences. This is illustrated by FIG. 4, in which car sprite 34 is shown with transparent pixels surrounding the car. With this provision, the car can be moved across the display frame simply by adjusting its horizontal coordinate. The tree remains visible through those portions of car sprite 34 which do not actually form the car. Without the provision for transparent pixels, it would be necessary to copy information from underlying sprites into the sprite containing the moving image. This would have to be done for every change in sprite location.

FIG. 5 shows an example of a computer and display system which utilizes sprite management hardware, generally designated by the reference numeral 40. System 40 includes a desktop unit 42 and an external display device such as a CRT 44. CRT 44 includes a display frame 46 comprising a plurality or matrix of display frame pixels (not individually shown).

Desktop unit 42 includes a CPU or data processor 48, random access sprite memory 50, and a sprite display processor 52. Both data processor 48 and display processor 52 have access to sprite memory 50 through a control bus 53. It is apparent that the arrangement of FIG. 5 is quite similar to the arrangement of FIG. 1. The primary difference is in the way pixel values are stored in memory. In the frame-buffer or bit-mapped system of FIG. 1, a frame buffer corresponding to the entire display frame was stored in memory. In the sprite system of FIG. 5, however, a plurality of individual bit-maps, corresponding to a plurality of sprites, are stored by data processor 48 in sprite memory 50. Specifically, data processor 48 defines a plurality of sprite buffers 54 within sprite memory 50. Each sprite buffer stores a two-dimensional matrix or array of pixel values corresponding to a pixel matrix of an individual sprite. Thus, to compose an image or display frame, data processor 48 writes appropriate data to each sprite buffer 54. Sprite display processor 52 reads from each sprite buffer, individually, and performs the necessary manipulations to drive CRT 44 in such a way that the various sprites are properly positioned and layered within display frame 46, in accordance with their specified horizontal, vertical, and depth coordinates.

Sprite management hardware assumes a great deal of the overhead which would otherwise be required of application programs in managing overlying images. The sprite management system described above also works well for displaying windowed video images such as television images or digitized motion pictures which are received from an external source such as a non-volatile storage medium or a remote database. The successive frames of a moving or video image such as this are simply written to their own sprite buffer, and the sprite management hardware takes care of proper layering of the sprite relative to other sprites. Hardware can be provided to receive, decode, or decompress such images and to write them directly to sprite memory without CPU intervention.

Unfortunately, the hardware-based sprite management features described above are not readily available for use with popular desktop or personal computers such as IBM/PC-compatible personal computers. Rather, software developers use software-based techniques for displaying sprites. One way of doing this is to maintain sprite buffers as shown in FIG. 5, and to combine such sprite buffers using appropriate logic before writing them to a bit-mapped frame buffer such as shown in FIG. 1. This can be simplified by simply writing the individual sprite buffers, sequentially from back to front, to the bit-mapped frame buffer. In this way, uppermost sprites overwrite previously written lowermost sprites. The result is that the sprites appear layered in accordance with their specified depths.

This overwriting scheme might become somewhat unwieldy if it were utilized to display a video sequence in a sprite. This is because the scheme would require re-writing very significant portions of a frame buffer for every new frame from the video sequence. This could become very slow.

Accordingly, there is a need and desire for a system which can display video sequences as sprites without requiring specialized sprite hardware. It would be very desirable if such features could be efficiently provided by operating system software within the constraints of existing or widely-available hardware devices, so that application programs could use such features at a high level without having to be concerned with particular features or limitations of underlying hardware.

The invention described below provides these capabilities. Specifically, it provides a method of composing a bit-mapped display frame and frame buffer from a plurality of graphic sprites, one or more of which is formed by a video sequence, without requiring specialized sprite management hardware. These features are accomplished within the limitations of hardware which can be readily obtained for use with popular computers at reasonable prices.

SUMMARY OF THE INVENTION

The preferred embodiment of the invention is a sprite management system implemented by a combination of software and commonly available graphic subsystems. In accordance with the invention, a data processing apparatus or desktop unit includes a bit-mapped graphics adapter for displaying a display frame comprising a plurality of display frame pixels. The sprite management system composes the display frame from a plurality of graphic sprites. Each graphic sprite comprises a plurality of sprite pixels and corresponding sprite pixel values and has specified horizontal and vertical display frame coordinates relative to the display frame. In addition, each graphic sprite has a specified depth coordinate relative to the other sprites.

The sprite management system includes a data processing device or microprocessor connected to access a display frame composition buffer in system DRAM (dynamic random access memory). The microprocessor is programmed to write pixel values of individual sprites to locations in the display frame composition buffer specified by the horizontal and vertical display frame coordinates of said individual sprites. This writing begins with the pixel values of the sprite having the greatest depth coordinate and proceeds with the pixel values of the remaining sprites in order of decreasing sprite depth coordinates. Each sprite pixel value written to a particular display frame composition buffer location replaces any sprite pixel value previously written to that same location. The result is a display frame in which the plurality of graphic sprites appear layered with respect to each other in accordance with their respective depth coordinates.

The invention allows a computer system to display a video sprite—a layered sprite containing a video image comprising an ordered succession of individual video frames. This feature is implemented using a video overlay circuit. The video overlay circuit is of a type which accepts a chroma-key (a particular color value) and which overlays a video image on only those portions of the composed display frame which have the chroma-key color value. To display the video sprite, the sprite management system creates a sprite consisting entirely of chroma-key values. This sprite is written to a bit-mapped frame or composition buffer in the order described above, in accordance with its depth coordinate. When the resulting display frame is processed by the video overlay circuit, the video image gets overlaid only on the portions of the chroma-key sprite which remain visible in the frame buffer after all sprites are transferred to the frame buffer. If desired, portions of the video sprite can be specified to have transparent pixels. All non-transparent pixels then contain the chroma-key value, and remaining pixels contain a pre-determined "transparent" value. Pixels having the transparent value are not transferred to the frame buffer.

BRIEF DESCRIPTION OF THE DRAWINGS

FIG. 2 is a simplified representation of two graphic sprites in accordance with the prior art.

FIG. 3 is a simplified representation of a display frame which includes the graphic sprites of FIG. 2.

FIG. 4 is a simplified representation of a display frame similar to that of FIG. 3, except that one of the graphic sprites of FIG. 4 includes transparent pixels.

DETAILED DESCRIPTION OF THE PREFERRED EMBODIMENTS

Figure 1:
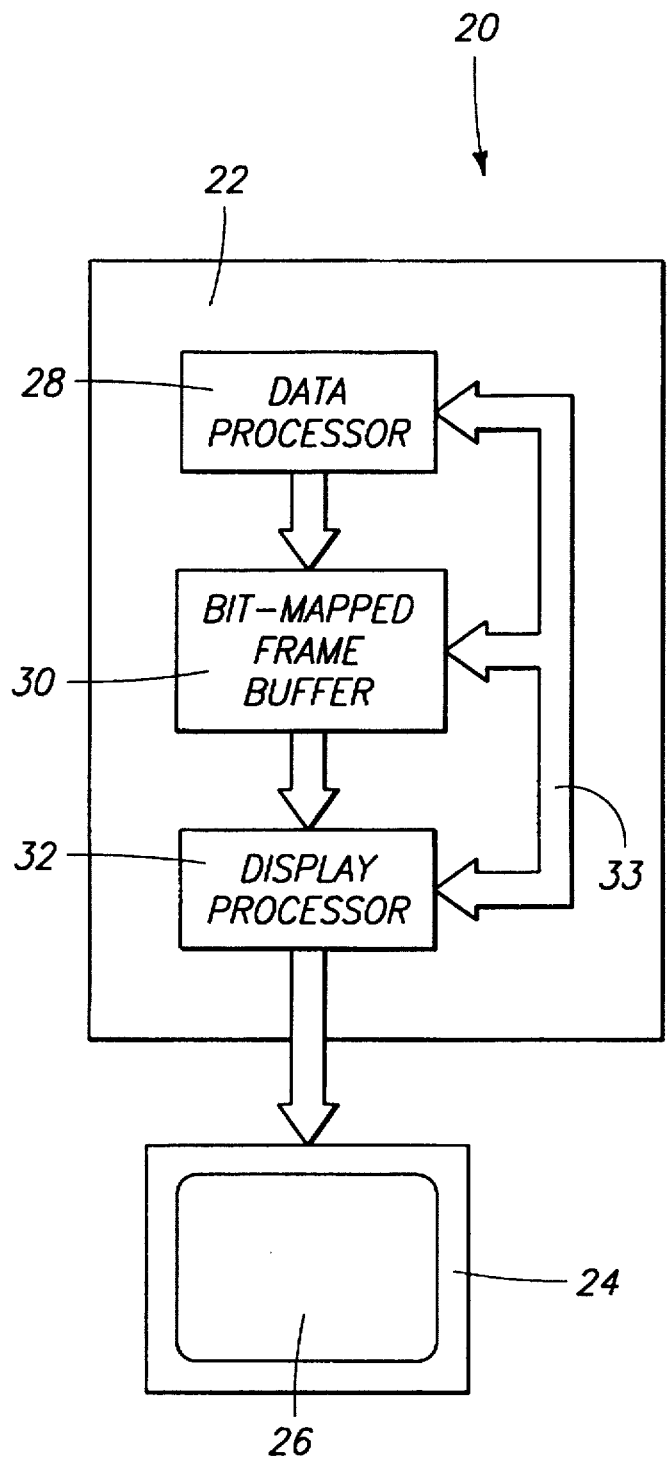
FIG. 1 is a block diagram of a prior art computer system incorporating a bit-mapped graphics subsystem.
Figure 5:
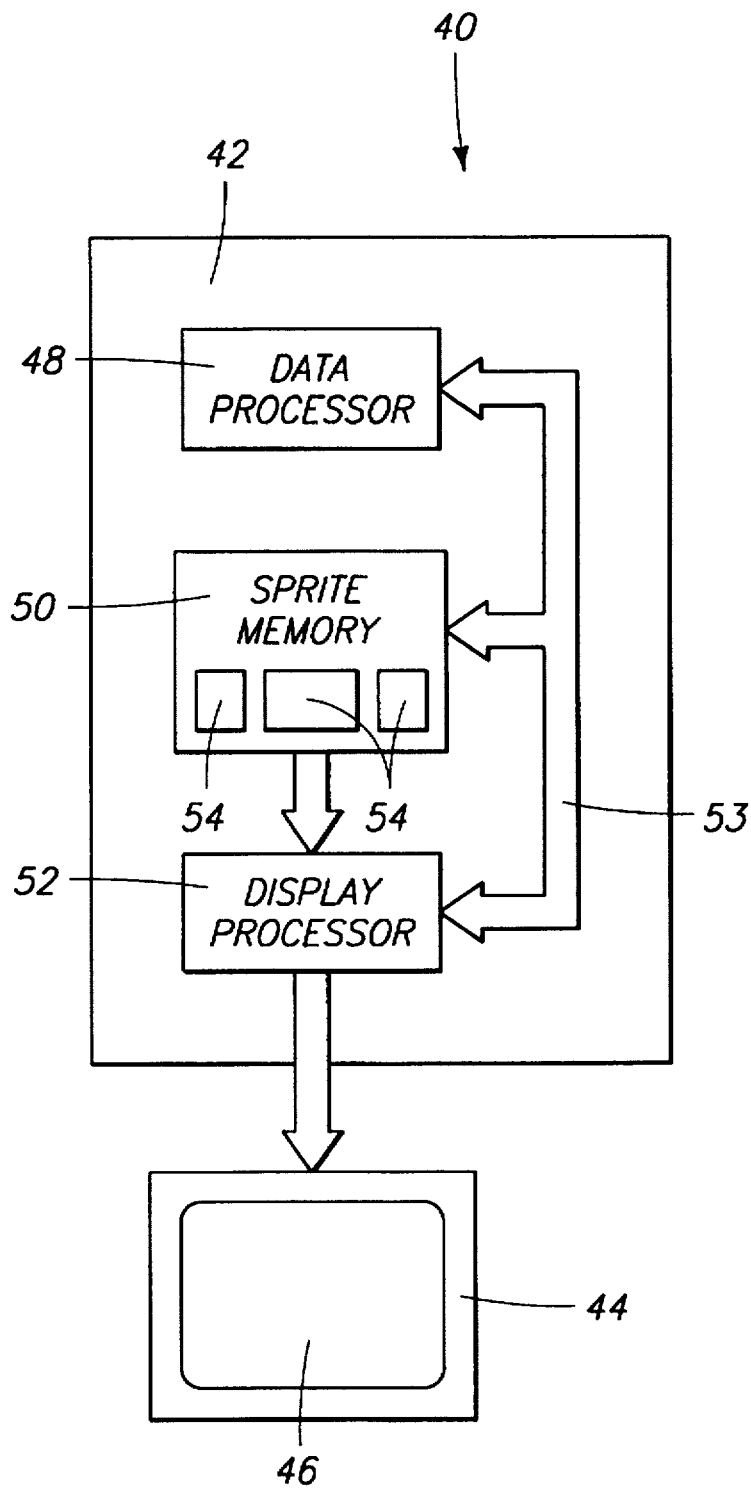
FIG. 5 is a block diagram of a prior art computer system incorporating sprite management hardware as part of its graphics subsystem.
Figure 6:
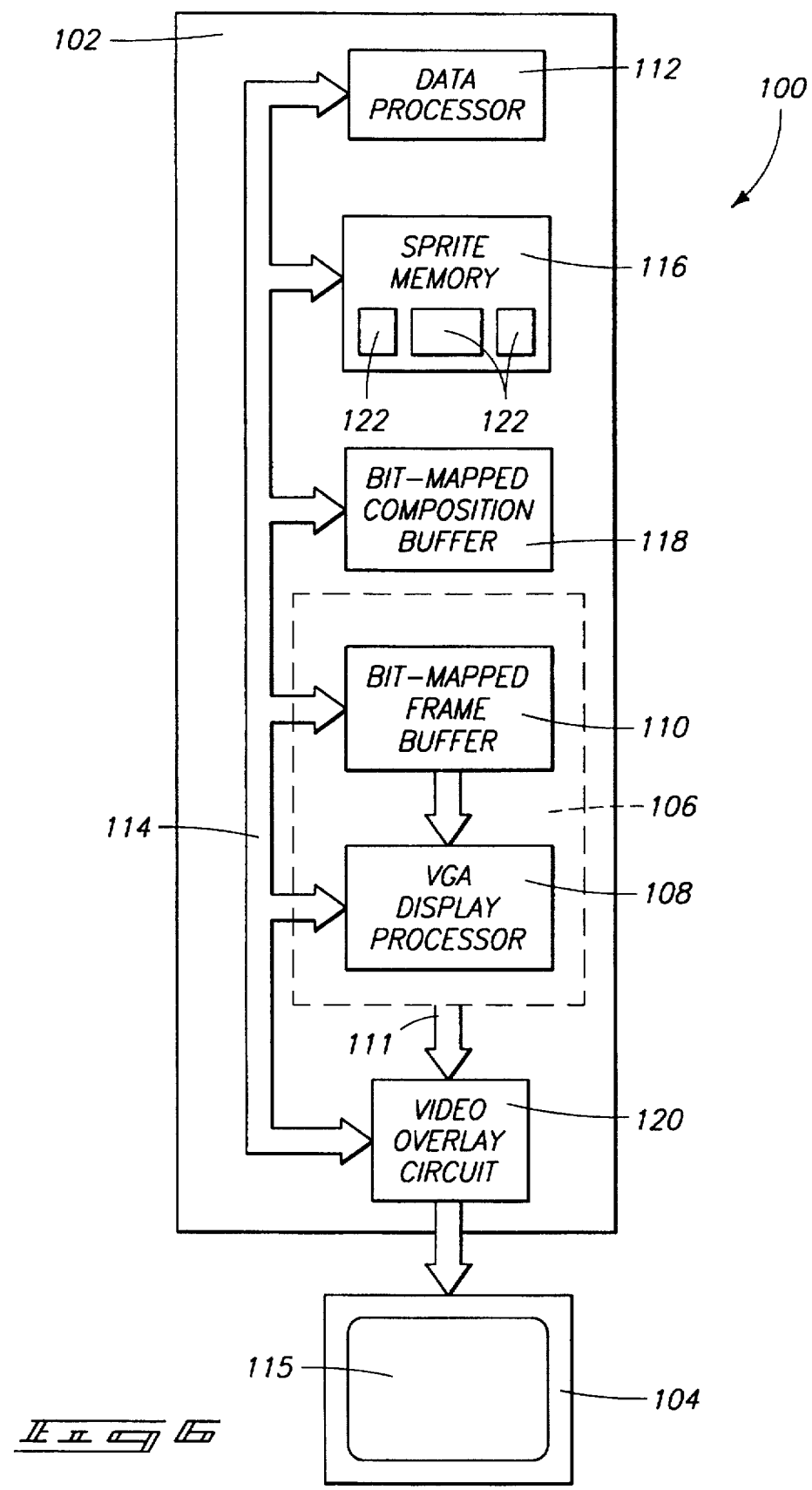
FIG. 6 is a block diagram of a data processing system or apparatus in accordance with a preferred embodiment of the invention.

FIG. 6 shows a data processing system or apparatus in accordance with a preferred embodiment of the invention, generally designated by the reference numeral 100. Apparatus 100 preferably comprises an IBM/PC-compatible desktop or laptop computer system 102 in conjunction with a graphics display device 104. As is most usual with popular computers of this type, computer system 102 has a VGA (video graphics array) or VGA-compatible display subsystem 106, comprising a display processor 108 and a bit-mapped display frame buffer or memory array 110. Display processor 108 has access to memory array 110 through a local bus 111. Computer system 102 also includes a microprocessor or data processing device 112. Frame buffer 110 and display processor 108 are connected through a data and control bus 114 to be accessed by data processor 112.

Graphics display device 104 is a conventional raster scan CRT or flat-panel display which is compatible with VGA subsystem 106. It displays a display frame 115 comprising a two-dimensional matrix or plurality of individual display frame pixels (not individually shown). Frame buffer 110 is preferably a contiguously-addressed block or array of randomly-addressable read/write memory or DRAM (dynamic random access memory) having a plurality of storage locations. Data processor 112 stores a plurality of display frame pixel values at mapped storage locations within frame buffer 110 corresponding to the respective individual pixels of display frame 115. Each display frame pixel value represents a particular color or brightness for the corresponding display frame pixel. Display processor 108 continually and repetitively retrieves the display frame pixel values from frame buffer 110 and uses these values to create driver signals at levels which are appropriate to produce the specified colors or brightness levels at the corresponding display frame pixels. In this manner, the display frame is defined within frame buffer 110 by the stored pixel values, subject to further processing by a video overlay circuit 120 as described below.

Computer system 102 includes a random access read/write sprite memory 116 which is connected through data and control bus 114 to be accessed by data processor 112. Sprite memory 116 can be formed by conventional DRAM within computer system 102. Computer system 102 also includes a random access read/write display frame composition buffer 118 which is connected through data and control bus 114 to be accessed by data processor 112. Again, this memory can be formed by conventional DRAM within computer system 102. Composition buffer 118 is preferably of the same arrangement as frame buffer 110 of VGA subsystem 106 to store a plurality of display frame pixel values at mapped locations corresponding to the individual pixels of display frame 115. There is preferably a one-to-one correspondence between the storage locations of composition buffer 118 and frame buffer 110.

As is typical in computer systems of this nature, computer system 102 runs under a supervisory operating system. The operating system provides functions or device drivers for performing specific hardware-related and input/output operations. Application programs are desirably written to utilize these built-in functions. Alternatively, hardware operations can be performed by application programs themselves.

In the preferred embodiment of the invention, sprite management functions are integrated with an operating system running on data processor 112, so that hardware details are transparent to application programs. Application programs, which also run on data processor 112, utilize the operating system functions to display sprites. Alternatively, the features described herein could be implemented in whole or in part by application programs.

Specifically, computer system 102 includes a sprite management system within its operating system for repetitively composing a layered display frame from a plurality of graphic sprites. As already discussed, an individual sprite comprises a plurality or two-dimensional matrix of sprite pixels and corresponding sprite pixel values. Each sprite pixel value specifies the color or brightness of the corresponding sprite pixel. Each sprite has specified horizontal and vertical display frame coordinates relative to the layered display frame and a specified depth coordinate relative to the other sprites.

The sprite management system preferably includes software within the operating system software so that details of the sprite management and manipulations are transparent to application programs. System subroutines can be called or initiated by application programs to set up or define a plurality of individual sprite buffers 122 within sprite memory 116 corresponding to respective graphic sprites which are to be displayed on CRT 104. Each sprite buffer 122 is a bit-mapped memory block or array containing sprite pixel values at mapped locations corresponding to the pixels of the corresponding graphic sprite. Sprite buffers can be initially filled and maintained either by the sprite management software itself or by application programs.

Figure 7:
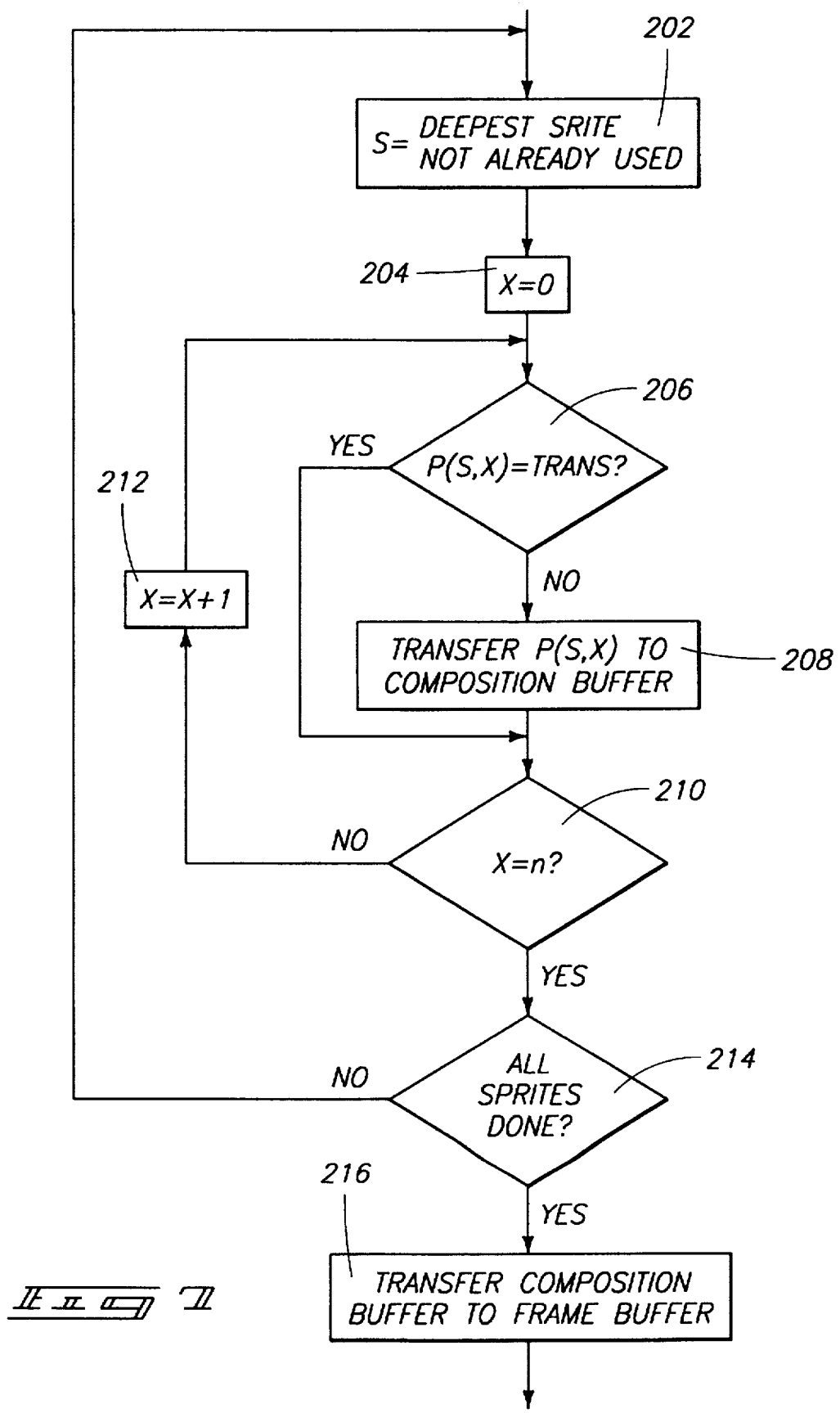
FIG. 7 is a flow chart showing preferred steps in accordance with the invention.

The sprite management system displays graphic sprites, as represented by the values in sprite buffers 122, at their specified horizontal and vertical coordinates within display frame 115; and layers the sprites within display frame 115 as indicated by their specified depth coordinates. FIG. 7 shows the preferred methodical steps carried out by the sprite management system in order to efficiently carry out this task without specialized hardware. In the preferred embodiment, the steps shown by FIG. 7 are implemented by data processor 112 in conjunction with operating system software. Application software needs merely to set up and maintain the desired sprite buffers by appropriate calls to the sprite management system and by directly writing to the sprite buffers. This setup and maintenance is similar or identical to that performed with conventional sprite management hardware as described in the Background section. Thus, the method illustrated by FIG. 7 assumes that sprite memory 116 already contains defined sprite buffers 122 with desired pixel values.

The method shown by FIG. 7 includes steps for writing sprite pixel values from sprite buffers 122 to display frame composition buffer 118. More particularly, the preferred methods of the invention comprise first identifying a sprite depth order which begins with the sprite having the greatest depth coordinate and which continues with the remaining sprites in order of decreasing sprite depth coordinates. The preferred methods further comprise transferring pixel values of individual sprites from their respective sprite buffers 122 to locations in display frame composition buffer 118 specified by the horizontal and vertical coordinates of said individual sprites. This writing or transferring step is performed step by step, in accordance with the identified sprite depth order. It therefore begins with the pixel values of the sprite having the greatest depth coordinate and proceeds with the pixel values of the remaining sprites in order of decreasing sprite depth coordinates.

However, only those sprite pixel values which represent non-transparent pixels are transferred. Transparent pixels are represented by pixel values equalling a pre-selected transparent pixel value. Data processor 112 is programmed to transfer only those sprite pixel values which are not equal to the pre-selected transparent pixel value.

Transferring sprite pixel values to composition buffer 118 in this manner creates a display frame in which the plurality of graphic sprites appear layered with respect to each other in accordance with their respective depth coordinates. As each sprite pixel value is written to a particular location within composition buffer 118, it replaces or overwrites any pixel values previously written to that same location. Thus, when an upper-level sprite has non-transparent pixels at the same vertical and horizontal coordinates as a lower-level sprite, only those pixels of the upper-level sprite will remain in composition buffer 118.

After transferring the pixel values of all of sprite buffers 122, the pixel values contained in composition buffer are transferred to frame buffer 110 for subsequent display on CRT 104 by display processor 108. This process is repeated periodically to reflect changes in sprite composition or position.

Referring now to the more specific steps shown in FIG. 7, each transfer from sprite memory 116 to composition buffer 118 begins with a step 202 of determining the sprite having the greatest depth coordinate from among those sprites whose buffers have not yet been transferred to composition buffer 118. A variable S is set to an appropriate sprite number indicating the deepest sprite. Another variable X is set to zero in step 204. Variables S and X are used in the following steps to indicate a pixel P(S,X), where S specifies a particular sprite or sprite buffer and X indicates a particular pixel or pixel value within that sprite or sprite buffer. Steps 206, 208, 210, and 212 transfer non-transparent pixel values from the selected sprite buffer S to composition buffer 118. Decision block 206 indicates a determination of whether the current pixel value is equal to the preselected transparent value. If it is not, block 208 is executed to transfer pixel P(S,X) to composition buffer 118. The pixel value is written to the appropriate pixel location and replaces any previous pixel value stored therein. Conversely, if the pixel value is transparent, block 208 is skipped and no new pixel values are placed in composition buffer 118. Execution then continues with block 210, which is a decision block for determining whether all pixels within sprite buffer S have been transferred. The value n represents the total number of pixels in sprite S. If not all pixels have been transferred, program execution proceeds to block 212, in which X is incremented, and then back to blocks 206 and 208 for transfer of another pixel.

When all non-transparent pixels of sprite buffer S have been transferred to composition buffer 118, a decision block 214 determines whether all sprites have been transferred. If they have not, the process repeats beginning at block 202. Otherwise, block 216 is executed, and the pixel values from composition buffer 118 are transferred to their corresponding locations in frame buffer 110. This process is repeated periodically to update display frame 115.

Note that frame buffer 110 could itself constitute the composition buffer, making step 216 unnecessary. Sprites would then be written directly to frame buffer 110, without going through the intermediate step of being written to a separate composition buffer. Writing in this case would preferably take place only during vertical retraces of CRT 104 to avoid flashing or flickering. It is preferable to use a separate composition buffer as shown in FIG. 6, and to transfer the entire buffer during vertical retrace periods.

The system of FIG. 6 also includes features for displaying a video sprite comprising a moving or video image. A video image normally comprises a rapid succession of static images which give the impression of continuous movement within a picture frame. Television pictures and moving picture displays are examples of video images. Video images can also be received in digital format from archival storage devices, remote databases, or network connections.

Data processing system 100 includes a video overlay circuit or adapter 120 connected to receive the display frame pixel values contained in frame buffer 110. The "Reel-Magic" MPEG (motion picture expert group) board model #40310, manufactured by Sigma Designs of Fremont, Calif., is an example of a preferred overlay circuit. This add-on board connects by a ribbon cable to the feature connector of a conventional VGA graphics adapter to receive display frame pixel values from the VGA graphics adapter. It also accepts a video image in the form of compressed digital video through system bus 114, preferably by direct memory access or port I/O. Video overlay circuit 120 has hardware (not shown) for decompressing the digital video and for overlaying the resultant video image on the display frame at horizontal and vertical coordinates which have been previously specified by data processor 112. Video overlay circuit 120 has a further feature for overlaying the video image only on display frame pixels having values equal to a pre-selected key value or "chroma-key." This is a common feature on circuits such as the "ReelMagic" MPEG board described above. Video overlay circuit 120 forms overlay means for overlaying a received video image on the display frame at specified coordinates having sprite values equal to the chroma-key value.

Figure 8:
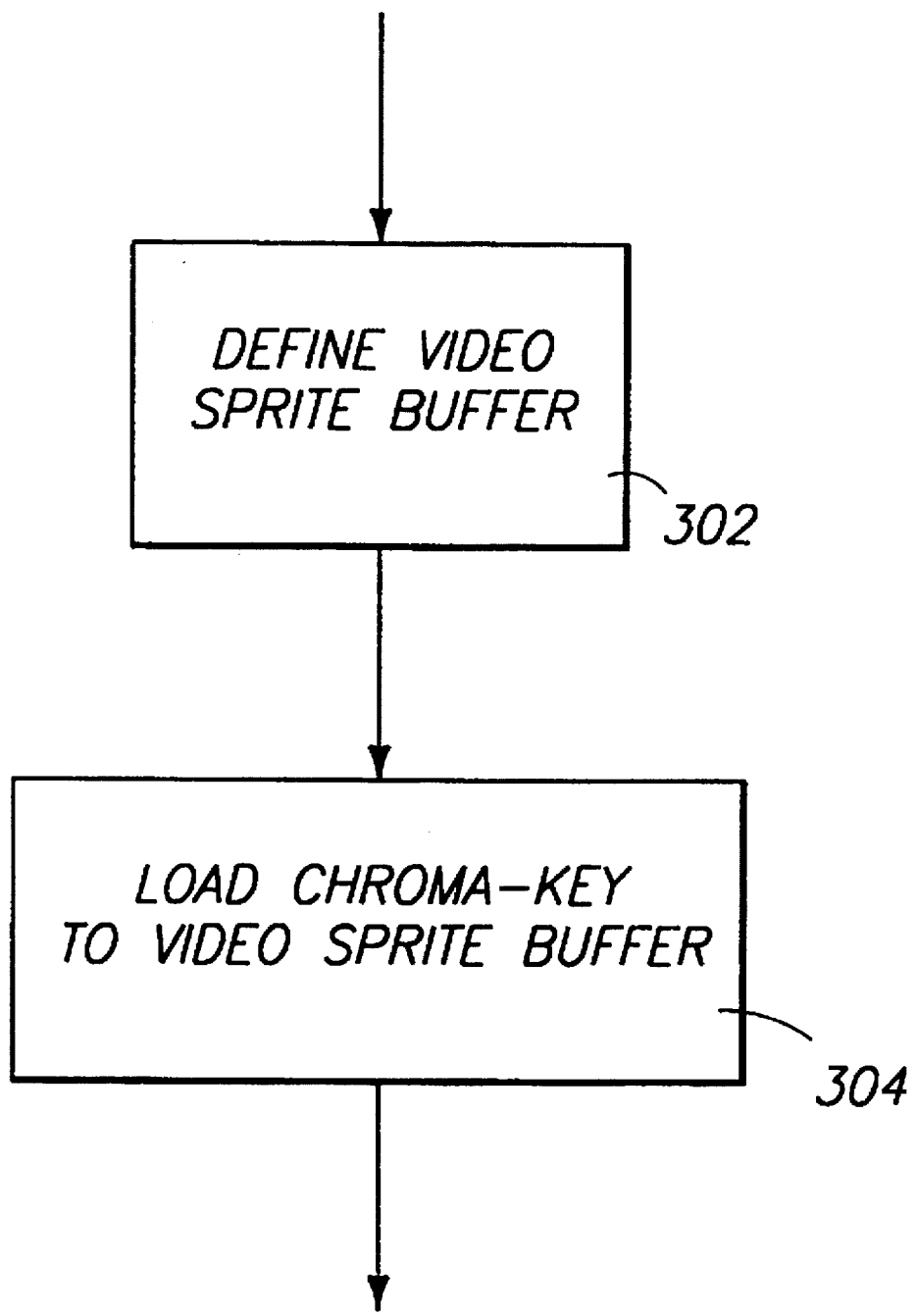
FIG. 8 is a flow chart showing further preferred steps in accordance with the invention.

FIG. 8 shows steps in forming and displaying a video graphic sprite. FIG. 8 shows a step 302, performed by data processor 112, of defining a sprite buffer within sprite memory 116 to correspond to a sprite which is designated to contain the video image from video overlay circuit 120. Data processor 112 is programmed to perform a further step 304 of setting or loading all the non-transparent sprite pixel values of this sprite buffer to the pre-selected key value or chroma-key. Pixels which are intended to be transparent are loaded with the preselected transparent pixel value. The loaded sprite buffer is then transferred to composition buffer 118 and frame buffer 110 during normal execution of the steps of FIG. 7. The display frame pixel values are then communicated without further intervention to video overlay circuit 120 through the feature connector of VGA subsystem 106.

In the preferred embodiment, data processor 112 forms the means for performing the various steps described above. For example, data processor 112 forms loading means for loading a designated sprite buffer with the chroma-key value when that sprite buffer is to display a video image. Data processor 112 also forms transfer means for writing or transferring pixel values from sprite buffers to the display frame composition buffer. Data processor 112 and associated circuits further form means for supplying video data to the video overlay circuit.

Figure 9:
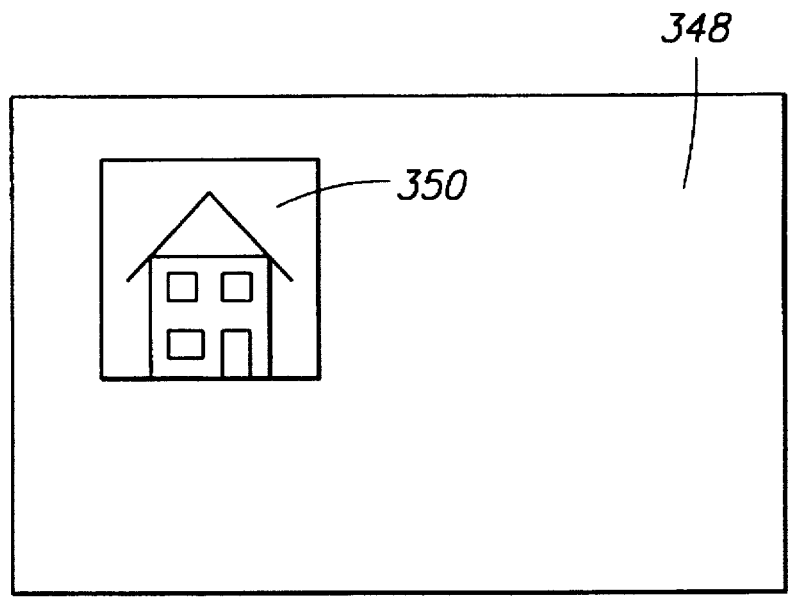
FIG. 9 is a simplified representation of a display frame including a lowermost static sprite.
Figure 10:
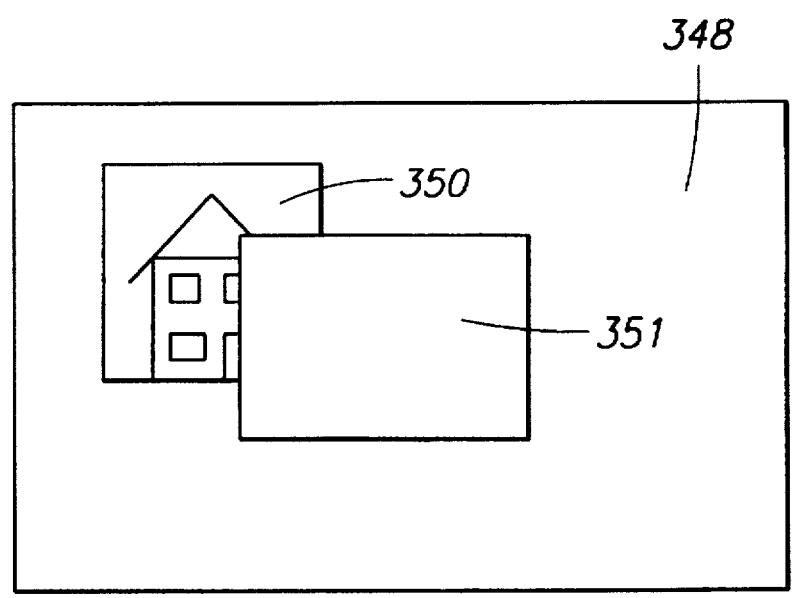
FIG. 10 is a simplified representation of the display frame of FIG. 9, with the addition of a middle chroma-key sprite.
Figure 11:
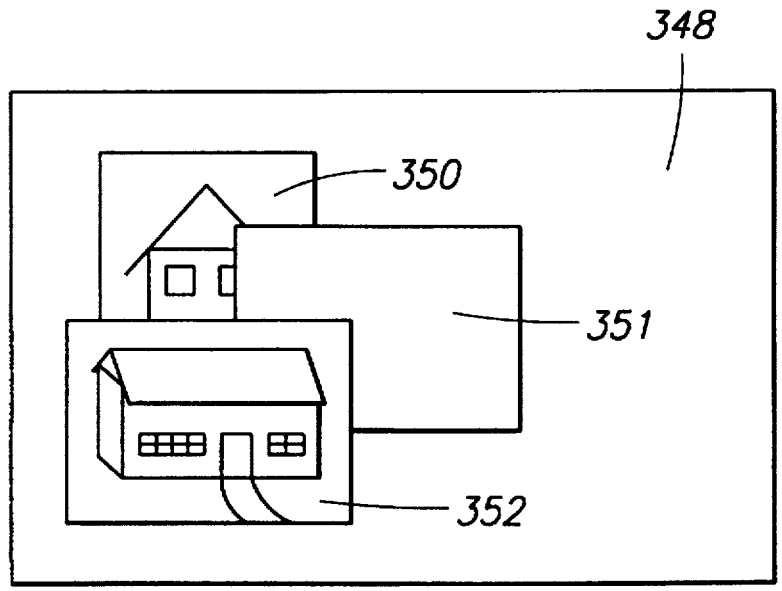
FIG. 11 is a simplified representation of the display frame of FIG. 10, with the further addition of an uppermost video sprite.

FIGS. 9–11 show a display frame 348, as represented in composition buffer 118, during the process of transferring three overlying sprites 350, 351, and 352 to composition buffer 118. Lowermost sprite 350 is a static or non-video sprite having a depth coordinate of 3. Middle sprite 351 is designated to contain the digital video image received by video overlay circuit 120. Each of its pixel values is thus equal to the pre-selected key or chroma-key value. It has a depth coordinate of 2. Uppermost sprite 352 is another static or non-video sprite, having a depth coordinate of 1.

The process of FIG. 7 results in lowermost sprite 350 being transferred first to composition buffer 118 since it has the greatest depth coordinate. This results in a display frame representation within composition buffer 118 as shown in FIG. 9. FIG. 10 shows the display frame represented by composition buffer 118 after transferring the sprite buffer of middle sprite 351. This sprite contains no image—just a solid pixel value equal to the chroma-key of video overlay board 120. Uppermost sprite 352 has been transferred to composition buffer 118 in FIG. 11. Note that the steps of FIG. 7 result in each of the three sprites being properly layered, wherein upper sprites appear to overlie lower sprites. Middle sprite 35 1, although it contains no image, properly overlies lowermost sprite 350, and properly underlies uppermost sprite 352. Uppermost sprite 352 lies atop both of the other sprites.

As discussed with reference to FIG. 7, this representation of the display frame, composed in composition buffer 118, is then communicated to frame buffer 110, and then to video overlay circuit 120. Video overlay circuit 120 performs a step of overlaying the video image on the display frame at the specified horizontal and vertical coordinates of middle sprite 351. However, this overlaying is performed only over those display frame pixels which have values equal to the pre-selected chroma-key value. Thus, the video image is overlaid only on those portions of middle sprite 351 which are not covered by uppermost sprite 352.

Figure 12:
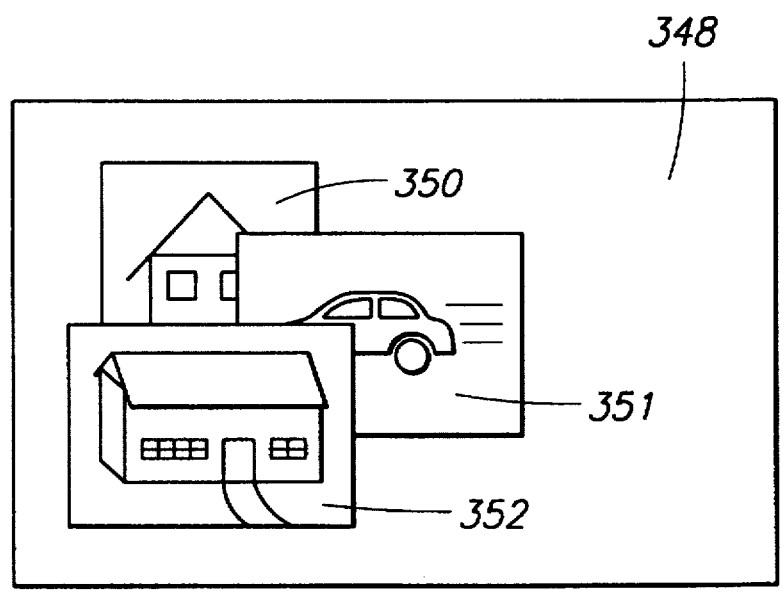
FIG. 12 is a simplified representation of the display frame of FIG. 11, with a video image displayed in the middle, chroma-key sprite.

The result is as shown in FIG. 12. Middle sprite 351 and its video image appear layered in accordance with the depth coordinate of sprite 351 and with the depth coordinates of the other sprites. The effect could be enhanced with the use of transparent pixels as part of uppermost sprite 352, and possibly as part of the video image of middle sprite 351. As a further feature, middle sprite 351 could have a preselected group of pixel values equal to the transparent pixel value. Doing this would allow an application program to insert "holes" in the video sprite, through which underlying sprites would be visible.

The system described above is an efficient method of implementing automated sprite management without requiring specialized hardware. Static sprites can be displayed and managed using without requiring video hardware beyond that which is almost universally supplied with popular personal computers. Video images can be displayed with the addition of video overlay hardware of a type which is commonly available at a reasonable cost.

In compliance with the patent statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. In a data processing apparatus having a graphics display device for displaying a display frame comprising a plurality of display frame pixels, the data processing apparatus having a display frame composition buffer with mapped locations corresponding to the individual display frame pixels, a method of displaying graphic sprites represented by sprite pixels and having specified depths relative to each other, the method comprising the following steps:

designating at least one of the graphic sprites to be a video sprite;

setting non-transparent pixels of the designated graphic sprite to a pre-selected key value;

writing at least the non-transparent pixels of the graphic sprites to the display frame composition buffer;

beginning said writing step with the pixels of the graphic sprite having the greatest depth and proceeding with the pixels of the remaining graphic sprites in order of decreasing depth, wherein each sprite pixel written to a particular display frame composition buffer location replaces any sprite pixel previously written to that same particular display frame composition buffer location;

overlaying a video image on the display frame, said overlaying being performed only over those display frame pixels contained in the display frame composition buffer which equal the pre-selected key value, the designated graphic sprite and its video image thereby appearing layered among the other graphic sprites in accordance with the respective depths of the graphic sprites.

2. A method as recited in claim 1 wherein the writing step comprises writing only the non-transparent pixels of the graphic sprites.

3. A method as recited in claim 1 wherein said setting step comprises setting only the non-transparent pixels of the designated sprite to the pre-selected key value.

4. A method as recited in claim 1 wherein said setting step comprises setting only the non-transparent pixels of the designated sprite to the pre-selected key value, the method further comprising an additional step of setting the transparent pixels of the designated sprite to a pre-selected transparent pixel value.

5. A method as recited in claim 1 wherein said setting step comprises setting only non-transparent pixels of the designated sprite to the pre-selected key value, the method further comprising an additional step of setting the transparent pixels of the designated sprite to a preselected transparent pixel value, said writing step comprising writing only those pixels which do not equal the pre-selected transparent pixel value.

6. In a data processing apparatus having a graphics display device for displaying a display frame comprising a plurality of display frame pixels, the data processing apparatus having a display frame composition buffer for storing a plurality of display frame pixel values at mapped locations corresponding to the individual display frame pixels, a method of displaying graphic sprites represented by sprite pixels and corresponding sprite pixel values stored in individual sprite buffers, the graphic sprites having specified depths relative to each other, the method comprising the following steps:

designating at least one of the graphic sprites to be a video sprite;

writing a pre-selected key value to at least those locations in the sprite buffer of the designated graphic sprite which correspond to non-transparent sprite pixels;

identifying a sprite depth order which begins with the graphic sprite having the greatest depth and which continues with the remaining graphic sprites in order of decreasing sprite depth;

transferring pixel values of individual graphic sprites from their respective sprite buffers to the display frame composition buffer;

said transferring step being performed sprite by sprite in accordance with the identified sprite depth order, wherein each sprite pixel value transferred to a particular display frame composition buffer location replaces any sprite pixel value previously transferred to that same particular display frame composition buffer location;

communicating the pixel values transferred to the display frame composition buffer to a video overlay circuit;

the video overlay circuit performing a step of overlaying a video image on the display frame, said overlaying being performed only over those display frame pixels which have values equal to the pre-selected key value, the designated graphic sprite and its video image thereby appearing layered in accordance with the depths of the graphic sprites.

7. A method as recited in claim 6 wherein the transferring step comprises transferring only the non-transparent pixels of the graphic sprites.

8. A method as recited in claim 6 wherein the writing step writes the pre-selected key value to only those locations in the sprite buffer of the designated graphic sprite which correspond to non-transparent sprite pixels.

9. A method as recited in claim 6 wherein the writing step writes the pre-selected key value to only those locations in the sprite buffer of the designated graphic sprite which correspond to non-transparent sprite pixels, the method further comprising an additional step of writing a pre-selected transparent pixel value to locations in the sprite buffer of the designated graphic sprite which correspond to transparent pixels.

10. A method as recited in claim 6 wherein the writing step writes the pre-selected key value to only those locations in the sprite buffer of the designated graphic sprite which correspond to non-transparent sprite pixels, the method further comprising an additional step of writing a pre-selected transparent pixel value to locations in the sprite buffer of the designated graphic sprite which correspond to transparent pixels, said transferring step comprising transferring only those pixel values which are not equal to the pre-selected transparent pixel value.

11. A method as recited in claim 6 and further comprising:

specifying a pre-selected transparent pixel value to represent transparent sprite pixels;

wherein the transferring step comprises transferring only those sprite pixel values which are not equal to the pre-selected transparent pixel value.

12. In a data processing apparatus having a graphics display device for displaying a display frame comprising a plurality of display frame pixels, a sprite management system for displaying graphic sprites represented by sprite pixels, the graphic sprites having specified depths relative to each other, the sprite management system comprising:

a data processing device;

a display frame composition buffer connected to be accessed by the data processing device for storing a plurality of display frame pixels at mapped locations corresponding to the individual display frame pixels;

the data processing device being programmed to designate at least one of the plurality of graphic sprites to be a video sprite and to set non-transparent pixels of the designated sprite to a pre-selected key value;

the data processing device being further programmed to write at least the non-transparent pixels of the graphic sprites to the display frame composition buffer, said writing beginning with the pixels of the graphic sprite having the greatest depth and proceeding with the pixels of the remaining graphic sprites in order of decreasing sprite depth, wherein each sprite pixel written to a particular display frame composition buffer location replaces any sprite pixel previously written to that same particular display frame composition buffer location;

the sprite management system further comprising a video overlay circuit connected to receive the written pixel values from the display frame composition buffer and to overlay a video image on the display frame, the video overlay circuit being of a type which overlays the video image only on display frame pixels having values from the composition buffer which are equal to the pre-selected key value, the designated graphic sprite and its video image thereby appearing layered among the other graphic sprites in accordance with the depths of the graphic sprites.

13. A sprite management system as recited in claim 12 wherein the data processing device is further programmed to write only the non-transparent pixels of the graphic sprites to the display frame composition buffer.

14. A sprite management system as recited in claim 12 wherein the data processing device is further programmed to set only the non-transparent pixels of the designated graphic sprite to the pre-selected key value.

15. A sprite management system as recited in claim 12 wherein the data processing device is further programmed to set only the non-transparent pixels of the designated graphic sprite to the pre-selected key value, the data processor being further programmed to set the transparent pixels of the designated sprite to a pre-selected transparent pixel value.

16. A sprite management system as recited in claim 12 wherein the data processing device is further programmed to set only the non-transparent pixels of the designated graphic sprite to the pre-selected key value, the data processor being further programmed to set the transparent pixels of the designated sprite to a pre-selected transparent pixel value and to write to the display frame composition buffer only those pixels which do not equal the pre-selected transparent pixel value.

17. In a data processing apparatus having a graphics display device for displaying a display frame comprising a plurality of display frame pixels, a sprite management system for displaying graphic sprites represented by sprite pixels and corresponding sprite pixel values, the graphic sprites having specified depths relative to each other, the sprite management system comprising:

a data processing device;

a display frame composition buffer connected to be accessed by the data processing device for storing a plurality of display frame pixel values at mapped locations corresponding to the individual display frame pixels;

individual sprite buffers corresponding to the respective graphic sprites, the sprite buffers being connected to be accessed by the data processing device, the sprite buffers containing sprite pixel values at mapped locations corresponding to the pixels of the respective graphic sprites;

the data processing device being programmed to designate at least one of the plurality of graphic sprites to be a video sprite and to load the sprite buffer of the designated graphic sprite with a pre-selected key value;

the data processing device being further programmed to transfer non-transparent pixel values of individual graphic sprites from their respective sprite buffers to the display frame composition buffer, said transfer beginning with the pixel values of the graphic sprite having the greatest depth and proceeding with the pixel values of the remaining graphic sprites in order of decreasing sprite depth, wherein each sprite pixel value transferred to a particular display frame composition buffer location replaces any sprite pixel value previously transferred to that same particular display frame composition buffer location;

the sprite management system further comprising a video overlay circuit connected to receive the transferred pixel values from the display frame composition buffer and to overlay a video image on the display frame, the video overlay circuit being of a type which overlays the video image only on display frame pixels from the composition buffer which have values equal to the pre-selected key value, the designated graphic sprite and its video image thereby appearing layered among the other graphic sprites in accordance with the depths of the graphic sprites.

18. A sprite management system as recited in claim 17 wherein the data processing device is further programmed to transfer only the non-transparent pixel values of the individual graphic sprites.

19. A sprite management system as recited in claim 17 wherein the data processing device is further programmed to load the preselected key value to only those locations in the sprite buffer of the designated graphic sprite which correspond to non-transparent sprite pixels.

20. A sprite management system as recited in claim 17 wherein the data processing device is further programmed to load the preselected key value to only those locations in the sprite buffer of the designated graphic sprite which correspond to non-transparent sprite pixels, and to write a pre-selected transparent pixel value to locations in the sprite buffer of the designated graphic sprite which correspond to transparent pixels.

21. A sprite management system as recited in claim 17 wherein the data processing device is further programmed to load the preselected key value to only those locations in the sprite buffer of the designated graphic sprite which correspond to non-transparent sprite pixels, to write a pre-selected transparent pixel value to locations in the sprite buffer of the designated graphic sprite which correspond to transparent pixels, and to transfer to the display frame composition buffer only those pixel values which are not equal to the pre-selected transparent pixel value.

22. In a data processing apparatus having a graphics display device for displaying a display frame comprising a plurality of display frame pixels, a sprite management system for displaying graphic sprites represented by sprite pixels and corresponding sprite pixel values, the graphic sprites having specified depths relative to each other, the sprite management system comprising:

a display frame composition buffer which stores a plurality of display frame pixel values at mapped locations corresponding to the individual display frame pixels;

individual sprite buffers corresponding to the respective graphic sprites, the sprite buffers containing sprite pixel values at mapped locations corresponding to the pixels of the respective sprites;

at least one of the plurality of graphic sprites being designated as a video sprite;

loading means for loading the sprite buffer of the designated graphic sprite with a pre-selected key value;

transfer means for transferring pixel values of individual graphic sprites from their respective sprite buffers to the display frame composition buffer, said transfer means first transferring the pixel values of the graphic sprite having the greatest depth and subsequently transferring the pixel values of the remaining graphic sprites in order of decreasing sprite depths, wherein each sprite pixel value transferred to a particular display frame composition buffer location replaces any sprite pixel value previously transferred to that same particular display frame composition buffer location;

overlay means connected to receive the transferred pixel values from the display frame composition buffer for overlaying a video image on the display frame, the overlay means being further for overlaying the video image only on display frame pixels from the composition buffer which have values equal to the pre-selected key value, the designated graphic sprite and its video image thereby appearing layered among the other graphic sprites in accordance with the depths of the graphic sprites.

23. A sprite management system as recited in claim 22 wherein the transfer-means transfers only the non-transparent pixel values of the individual graphic sprites.

24. A sprite management system as recited in claim 22 wherein the loading means loads the pre-selected key value to only those locations in the sprite buffer of the designated graphic sprite which correspond to non-transparent sprite pixels.

25. A sprite management system as recited in claim 22 wherein the loading means loads the pre-selected key value to only those locations in the sprite buffer of the designated graphic sprite which correspond to non-transparent sprite pixels and loads a pre-selected transparent pixel value to locations in the sprite buffer of the designated graphic sprite which correspond to transparent pixels.

26. A sprite management system as recited in claim 22 wherein the loading means loads the pre-selected key value to only those locations in the sprite buffer of the designated graphic sprite which correspond to non-transparent sprite pixels and loads a pre-selected transparent pixel value to locations in the sprite buffer of the designated graphic sprite which correspond to transparent pixels, the transfer means transferring to the display frame composition buffer only those pixel values which are not equal to the pre-selected transparent pixel value.

* * * * *